United States Patent [19]

Chenault

[11] 4,253,895

[45] Mar. 3, 1981

[54] METHOD AND APPARATUS FOR FORMING A SEGMENTED MIRROR PARABOLIC SOLAR COLLECTOR TROUGH

[75] Inventor: David O. Chenault, Clear Lake, Iowa

[73] Assignee: Toltec Industries Inc., Clear Lake, Iowa

[21] Appl. No.: 36,255

[22] Filed: May 4, 1979

[51] Int. Cl.³ .............. B32B 31/00; B31F 23/10; F02M 23/14; G02B 5/08
[52] U.S. Cl. .................. 156/163; 156/224; 156/237; 156/249; 156/265; 264/152; 427/292; 350/299; 126/438
[58] Field of Search ............ 156/224, 63, 248, 246, 156/247, 242, 249, 233, 265, 163, 232, 211, 239, 237, 290; 264/1, 101, 152; 427/162, 163, 292; 350/292, 299, 294; 126/438

[56] References Cited

U.S. PATENT DOCUMENTS

| | | | |
|---|---|---|---|
| 2,978,806 | 4/1961 | Herbert, Jr. | 156/323 |
| 3,349,158 | 10/1967 | Maynard | 156/63 |
| 3,378,422 | 4/1968 | Kemp | 156/247 |
| 3,841,738 | 10/1974 | Caplan | 126/438 |
| 4,038,971 | 8/1977 | Bezborodko | 126/438 |
| 4,084,581 | 4/1978 | Vigoureux | 126/438 |

FOREIGN PATENT DOCUMENTS 620288 10/1935 Fed. Rep. of Germany ........... 156/63

Primary Examiner—John T. Goolkasian
Assistant Examiner—L. Falasco
Attorney, Agent, or Firm—Henderson & Sturm

[57] ABSTRACT

This invention relates in general to the manufacture of segmented mirror solar collector troughs and specifically to the method and apparatus employed to initially subject the faceted segments to a lateral compression by the application of a vacuum prior to impregnating the segments in a fiberglass substrate which maintains the compressive force when the vacuum is removed.

7 Claims, 5 Drawing Figures 4,253,895

METHOD AND APPARATUS FOR FORMING A SEGMENTED MIRROR PARABOLIC SOLAR COLLECTOR TROUGH

BACKGROUND OF THE INVENTION

There are many different methods and apparatus employed to manufacture parabolic solar collector surfaces. Invariably these methods are complex and costly and constitute a major portion of the overall cost of a solar collector system.

In an effort to reduce the cost of the shaped collector surface, many attempts have been made to utilize a segmented, as opposed to a one piece curved mirror surface, as can be seen by reference to U.S. Pat. Nos. 4,115,177, 4,084,581, 4,038,971 and 3,841,738.

These prior art methods and apparatus are deficient, in that the end product is usually; difficult to assemble, expensive to manufacture, easily damaged by chipping, expansion, contraction, deterioration of the mirror surface, water seepage between the segment and substrate, with subsequent ice formation which results in the cracking of the segments, impact by hailstones, rocks etc. and various and sundry other problems.

To date there has not been a method and apparatus devised which provides a solution to the inherent shortcomings found in the prior art.

SUMMARY OF THE INVENTION

An object of the present invention is the provision of a method and apparatus which will allow sturdy, long lasting segmented solar collector surfaces to be fabricated at a fraction of the cost normally associated with such devices.

Another object is to provide a method and apparatus which is simple to utilize and which will rigidly embed the mirror segment in a substrate.

A further object is the provision of a method and apparatus which will allow the faceted mirror segment to conform to any parabolic configuration while inducing a lateral compression between the facets in their finally assembled relationship.

Still another object is to provide a method and apparatus which allows the substrate to fill the gaps between the mirror facets to form a bearing surface which transmits the lateral compressive forces in the finished product and also serves as a water and vapor barrier.

These and other objects; advantages and novel features of the present invention will become apparent from the following detailed description of the invention when considered in conjunction with the accompanying drawings.

DESCRIPTION OF THE PREFERRED EMBODIMENT

Figure 1:
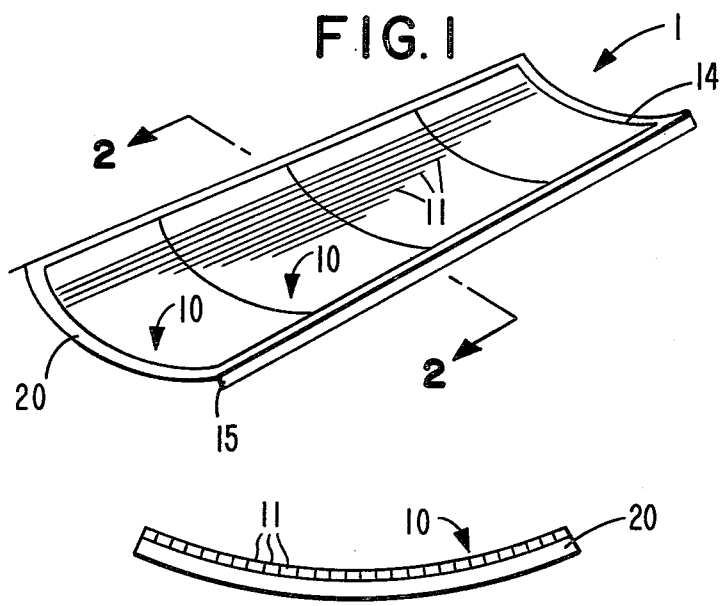
FIG. 1 is perspective view of the segmented mirror solar collector trough, which is fabricated by the method and apparatus which forms the basis of the instant invention.
Figure 2:
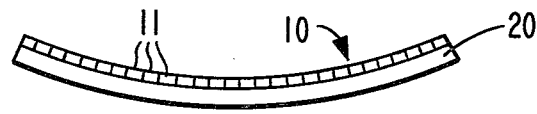
FIG. 2 is a cross sectional view of the solar collector trough taken through line 2—2 of FIG. 1.
Figure 3:
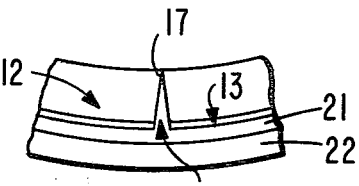
FIG. 3 is a detail view of the solar collector trough showing the relationship of the mirror segment facet and the fiberglass substrate.
Figure 4:
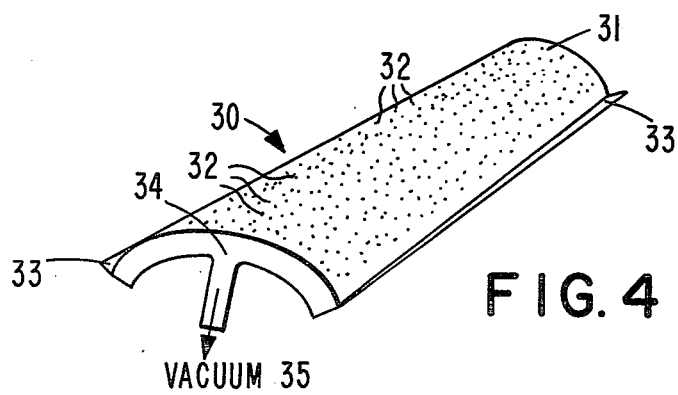
FIG. 4 is a perspective view of the vacuum mold employed in the fabrication of the solar collector trough.
Figure 5:
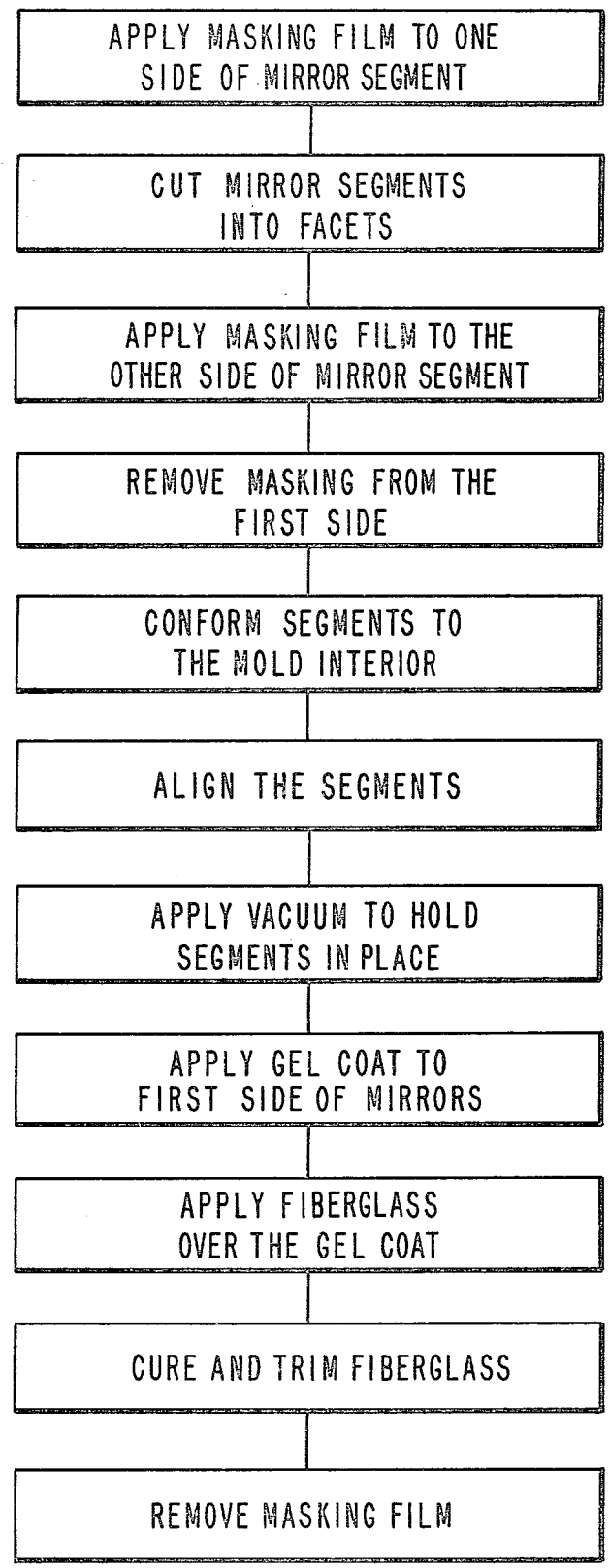
FIG. 5 is a schematic block diagram of the steps which comprise the method of manufacture employed.

FIG. 1 illustrates the faceted segmented mirror solar collector trough, designated generally as 1, which is manufactured in accordance with, and by, the method and apparatus which form the basis of this invention.

The solar collector trough 1 comprises a plurality of mirror segments 10 which are embedded in a shaped fiberglass substrate 20, which forms a trough having a curved section 14 running its entire length, and a depending lip portion 15 on both sides. Each of the mirror segment 10 comprise a plurality of contiguous facets 11 which are embedded in the substrate 20.

The solar collector trough is fabricated by the following methods. Each mirror segment is fabricated from a sheet of flat silver plated second surface mirror. A masking film made of plastic with an adhesive backing is placed on the silvered surface 13 of the mirror. The mirror is then placed, film side down, in a jig and the glass 12 is cut to form the individual facets 11. The glass is then cut in a well known manner. Prior to removing the faceted segment from the jig, the glass side of the mirror is covered with the masking film to maintain the contiguous orientation of the facets. The segment is then removed from the jig, and the first layer of masking film is removed from the silvered surface.

The segment is now ready to be placed on the vacuum mold 30 which is the key apparatus employed in this process. The mold 30 comprises an elongated curved surface 31 having an upturned lip portion 33 and a plurality of appertures 32 disposed in the mold surface. The apertures 32 extend into a plenum chamber 34 which is connected to a vacuum source 35. The curved surface 31, which can have any geometric configuration i.e. cylindrical, eleptical or parabolic, is waxed to provide a smooth slippery surface. One or more film covered mirror segment 10 are aligned on the mold surface with the film side down. The faceted segments attached to the masking film are initially compressed together as at 17, as the individual facets 11 attempt to conform to the curvature 31 of the mold 30. When the segments 10 are properly aligned, the vacuum source 35 is actuated to pull a vacuum, in the range of 7–12 inches of mercury, through the plenum chamber 34 and the apertures 32 in the mold 30. The vacuum performs a dual function in that it immobilizes the segments in their aligned position and further increases the lateral compression of the individual facets along their points of contact 17.

One of the well known physical properties of glass is that its strength increases under compression. Therefore, the vacuum temporarily structurally strengthens the eventual primary surface of the solar collector. The next step in the method involves coating the back side of the mirrors with a gel coat 21 which fills the interstices 18 between the mirror facets 11 and covers the silvered surface 13 of the mirror 10. When the gel coat becomes sufficiently cured, it is then sprayed with a mixture 22 of fiberglass filament rovings, resin and a catalyst to form the fiberglass matrix substrate 20. The fiberglass substrate is rolled to work out any air bubbles, allowed to cure and then trimmed to enhance its appearance. The vacuum can be released anytime after the gel coat has hardened or set. The gel coat 21 when it has cured, maintains the lateral compression 17 of the facets that was originally induced by the application of the vacuum. The gel coat also acts as a water and vapor barrier to prevent oxidation of the silvered surface 13, and more importantly to prevent moisture from accumulating between or beneath the facets 11 which can result in catastrophic consequences during freezing temperatures. The gel coat also provides the color and exterior finished surface of the fiberglass substrate. While the vacuum is being actuated and the gel coat is being applied, the masking film also performs a dual function in that its imperforate surface enhances the vacuum being drawn through the apertures 32, and it also inhibits migration of the gel coat onto the primary glass surface of the collector thru any gaps or flaws between adjacent facets. Finally when the fiberglass substrate has cured and the vacuum is released, the segmented, faceted mirror solar collector trough is removed from the mold and the masking film is peeled away to produce the finished product shown in FIG. 1.

It should be appreciated that a solar collector trough made in accordance with this invention results in a curved, second surface, faceted, mirror surface which is believed to be structurally as strong or stronger than its one-piece glass counter-part, and which can be produced for a fraction of the cost.

Having thereby disclosed the subject matter of this invention it should be obvious that many modifications, substitutes and variations of the invention are possible in light of the above teachings. It is therefore to be understood, that the invention may be practiced other than as specifically described, and should be limited only by the scope of the appended claims.

What I claim is:

1. A method for fabricating a solar collector trough comprising the steps of:
    placing a first imperforate film on the silvered surface of at least one flat mirror segment,
    cutting at least one mirror segment into a plurality of facets,
    placing a second imperforate masking film on the glass surface of the faceted mirror,
    removing the first masking film,
    aligning and conforming the faceted mirror and masking film to the curved surface of an apertured mold, whereby adjacent facets contact one another along their respective surfaces which are adjacent to the second masking film,
    forcing the contacting surfaces of the individual facets into lateral compression on the mold surface,
    coating the unmasked and uncompressed surfaces of the mirror segment with a hardenable gel coat material,
    allowing the hardenable gel coat material to cure, releasing the lateral compression force, and
    removing the second masking film.

2. A method for fabricating a solar collector trough as in claim 1; wherein,
    the individual facets are forced into lateral compression by the application of a vacuum introduced through the apertures in the curved surface of the mold.

3. A method for fabricating a solar collector trough as in claim 2, further comprising the step of;
    spraying the hardenable gel coat material with a mixture of fiberglass filament rovings, resin and a catalyst after the hardenable gel coat material has curved, to form a fiberglass matrix substrate.

4. A method for fabricating a solar collector trough as in claim 3; wherein,
    the hardenable gel coat material when it has cured maintains the lateral compressive force between the facets after the vacuum has been released.

5. A method for fabricating a solar collector trough as in claim 4; wherein,
    the hardenable gel coat material when it has cured forms a water vapor barrier in the interstices formed between the mirror facets.

6. A method for fabricating a solar collector trough comprising the steps of;
    cutting a flat mirror into facets,
    conforming and aligning the facets to a curved surface,
    placing a portion of the adjacent facets into lateral compression, and,
    coating the uncompressed portions of the facets with a hardenable material.

7. A method for fabricating a solar collector trough as in claim 6; wherein,
    a method of placing a portion of the adjacent facets into lateral compression comprises the step of introducing a vacuum through said surface.

* * * * *